(12) United States Patent
Erez et al.

(10) Patent No.: US 11,977,739 B2
(45) Date of Patent: May 7, 2024

(54) HANDLING WRITE DATA BURST FOR IMPROVED PERFORMANCE AND RESOURCE USAGE

(71) Applicant: Western Digital Technologies, Inc., San Jose, CA (US)

(72) Inventors: Eran Erez, Bothell, WA (US); Joseph R. Meza, Bernallio, NM (US); Nicholas J. Thomas, Edinburgh (SC)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/901,719

(22) Filed: Sep. 1, 2022

(65) Prior Publication Data

US 2024/0078015 A1    Mar. 7, 2024

(51) Int. Cl.
*G06F 3/06* (2006.01)

(52) U.S. Cl.
CPC .......... *G06F 3/0613* (2013.01); *G06F 3/0659* (2013.01); *G06F 3/0679* (2013.01)

(58) Field of Classification Search
CPC ..... G06F 3/0613; G06F 3/0659; G06F 3/0679
See application file for complete search history.

(56) References Cited

U.S. PATENT DOCUMENTS

| | | | |
|---|---|---|---|
| 5,729,709 A * | 3/1998 | Harness | G06F 13/1647 715/974 |
| 9,928,169 B2 | 3/2018 | Romanovsky et al. | |
| 10,019,352 B2 | 7/2018 | Brown et al. | |
| 10,101,918 B2 | 10/2018 | Hahn et al. | |
| 10,852,952 B1 | 12/2020 | Jung et al. | |
| 10,871,920 B2 | 12/2020 | Yoshii et al. | |
| 11,249,664 B2 | 2/2022 | Hahn et al. | |
| 2010/0042759 A1 * | 2/2010 | Srinivasan | G06F 12/0607 710/35 |
| 2015/0094875 A1 | 4/2015 | Duzly et al. | |
| 2015/0301763 A1 * | 10/2015 | Shaharabany | G06F 12/0246 711/147 |
| 2018/0025776 A1 * | 1/2018 | Achtenberg | G11C 29/42 714/764 |
| 2018/0081594 A1 * | 3/2018 | Jung | G11C 16/3495 |
| 2019/0377681 A1 | 12/2019 | Hodes et al. | |
| 2020/0194075 A1 | 6/2020 | Igahara et al. | |
| 2020/0201570 A1 | 6/2020 | Kim et al. | |
| 2021/0303419 A1 * | 9/2021 | Chen | G06F 3/0605 |
| 2022/0066692 A1 | 3/2022 | Noh et al. | |

FOREIGN PATENT DOCUMENTS

CN          110209357 A   *   9/2019   ............. G06F 3/061

* cited by examiner

*Primary Examiner* — Michael Krofcheck
(74) *Attorney, Agent, or Firm* — Morgan, Lewis & Bockius LLP

(57) ABSTRACT

Disclosed are systems and methods for large write planning for performance consistency and resource usage efficiency. A method is implemented using one or more controllers for one or more storage devices. The method includes receiving, via a host interface, a notification of a write data burst. The method also includes computing available spaces in a plurality of memories and a write ratio, to handle the write data burst to the plurality of memories, based on the notification. The method also includes receiving, via the host interface, the write data burst. The method also includes, in response to receiving the write data burst, toggling writes between the plurality of memories, based on the available spaces and the write ratio.

18 Claims, 4 Drawing Sheets

HANDLING WRITE DATA BURST FOR IMPROVED PERFORMANCE AND RESOURCE USAGE

BACKGROUND

Semiconductor memory devices, including flash memory, typically utilize memory cells to store data as an electrical value, such as an electrical charge or voltage. A flash memory cell, for example, includes a transistor with a floating gate that is used to store a charge representative of a data value. Flash memory is a non-volatile data storage device that can be electrically erased and reprogrammed. More generally, non-volatile memory (e.g., flash memory, as well as other types of non-volatile memory implemented using any of a variety of technologies) retains stored information even when not powered, as opposed to volatile memory, which requires power to maintain the stored information. Increases in storage density have been facilitated in various ways, including increasing the density of memory cells on a chip enabled by manufacturing developments, and transitioning from single-level flash memory cells to multi-level flash memory cells, so that two or more bits can be stored by each flash memory cell.

Host write accesses are typically short (e.g., 128 Kilobytes). Such small writes complete relatively fast, and typically there is negligible impact on user experience. On the other hand, some writes are large and may take significantly longer. These large writes may be a single large file, or a collection of smaller files batched for a single operation. Examples for large writes are directory of files copied from one device into a solid-state storage device (SSD), a game install, or an extraction of a compressed file. In some cases of a large write, a user is waiting for the write operation to complete. The user is sensitive to the operation progress and execution. In some cases, the host presents some form of progress indicator; for example, Windows 10 copy interface displays "Time remaining" and a performance over time graph. The way Windows 10 calculates the "Time remaining" is simple. For the first few seconds, there is no "Time remaining" indication, and Windows calculates the projection. During these few seconds, Windows measures the average transfer performance, i.e., P=Megabytes per second (MB/s). The average time is long enough to ignore any transitional effects, such as a small write cache. After a few seconds, a reverse calculation is performed; the performance and remaining size are known, so the remaining time is equal to MB/P. This method is accurate when performance is consistent across the entire operation.

However, an SSD's behaviour may result in inconsistent performance and poor user experience. One such behaviour is due to the introduction of quad-level cell (QLC) hybrid designs. In a hybrid design not and (NAND), each block can be configured to be either single-level cell (SLC) or QLC, prior to its programming. When configured as SLC, writes to NAND are much faster than QLC configuration. Based on space availability, hybrid SSD configures multiple blocks to SLC (sometimes called a write cache) that absorbs relatively large amounts of data in the order of tens (or even hundreds) of gigabytes at a blazing fast performance. After the SLC configured portion is consumed, and if write is sustained and continues to fill the SSD space, the SSD runs out of physical space. The SSD can no longer afford storing large amount of data in SLC blocks and then the SSD is required to start converting blocks from SLC to QLC. The conversion process includes reading the data from an SLC block N, writing it to a newly opened QLC block M, erasing the SLC block N and configuring block N to QLC. When there is a large amount of block conversion, the SSD performance can significantly degrade. This performance can even be slower than a typical QLC rate (that is non-hybrid) because not only new data is routed to QLC, but also there is a constant need to relocate data from the SLC to free up more QLC blocks for writing. After few seconds at crawling speeds, the user can suddenly notice that the "Timing remaining" is much longer than previously communicated.

The description provided in the background section should not be assumed to be prior art merely because it is mentioned in or associated with the background section. The background section may include information that describes one or more aspects of the subject technology, and the description in this section does not limit the invention.

BRIEF DESCRIPTION OF THE DRAWINGS

The accompanying drawings, which are included to provide a further understanding of the disclosure, are incorporated in and constitute a part of this disclosure, illustrate embodiments of the disclosure, and together with the description serve to explain principles of the disclosure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

The present description relates in general to data storage systems and methods, and more particularly to, for example, without limitation, handling a write data burst for performance consistency and resource usage efficiency. As discussed above, it is important to provide consistent performance and user experience for large writes. By planning the large writes in advance (e.g., scheduling writes across different types of memories (e.g., SLC, TLC, QLC)), performance is more consistent than conventional systems with ad-hoc routing of writes (e.g., systems that detect scarce SLC space and switching to TLC). The system according to the example techniques described herein may calculate available space across different types of memory and plan for large writes.

Figure 1:
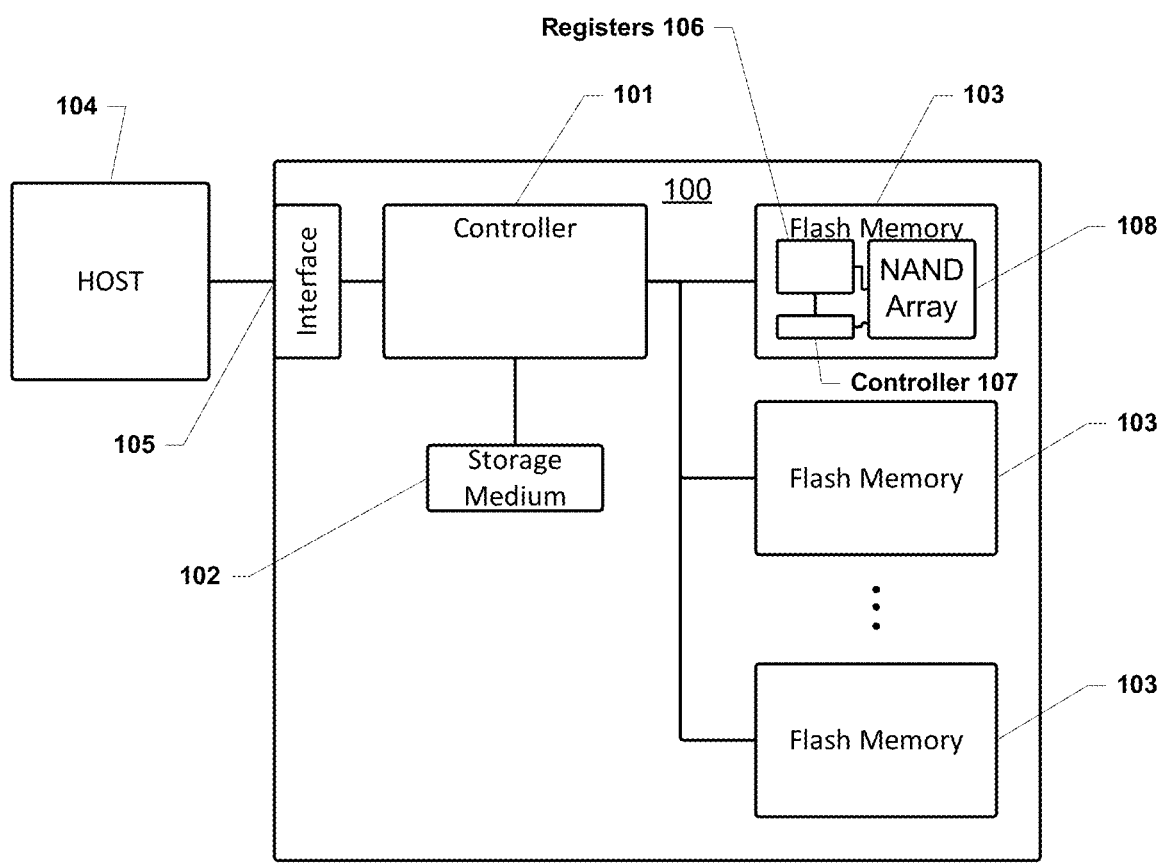
FIG. 1 is a block diagram illustrating components of an example data storage system, according to one or more embodiments.

FIG. 1 is a block diagram illustrating components of an example data storage system, according to aspects of the subject technology. As depicted in FIG. 1, in some aspects, a data storage system 100 (e.g., a solid state drive (SSD)) includes a data storage controller 101, a storage medium 102, and a flash memory array including one or more flash memory 103. The data storage controller 101 may be sometime referred to as a controller. A controller may include one or more controllers. The controller 101 may use the storage medium 102 for temporary storage of data and information used to manage the data storage system 100. The controller 101 may include several internal components (not shown), such as a read-only memory, other types of memory, a flash component interface (e.g., a multiplexer to manage instruction and data transport along a serial connection to the flash memory 103), an input/output (I/O) interface, error correction circuitry, and the like. In some aspects, all of these elements of the controller 101 may be integrated into a single chip. In other aspects, these elements may be separated on their own personal computer (PC) board.

In some implementations, aspects of the subject disclosure may be implemented in the data storage system 100. For example, aspects of the subject disclosure may be integrated with the function of the data storage controller 101 or may be implemented as separate components for use in conjunction with the data storage controller 101.

The controller 101 may also include a processor that may be configured to execute code or instructions to perform the operations and functionality described herein, manage request flow and address mappings, and to perform calculations and generate commands. The processor of the controller 101 may be configured to monitor and/or control the operation of the components in the data storage controller 101. A processor may be, for example, a microprocessor, a microcontroller, or a digital signal processor (DSP). A processor may be implemented using, for example, an application specific integrated circuit (ASIC), a field programmable gate array (FPGA), a programmable logic device (PLD), a controller, a state machine, gated logic, discrete hardware components, or a combination of the foregoing. One or more sequences of instructions may be stored as firmware on read-only-memory (ROM) within the controller 101 and/or its processor. One or more sequences of instructions may be software stored and read from the storage medium 102, the flash memory 103, or received from a host device 104 (e.g., via a host interface 105). ROM, the storage medium 102, the flash memory 103, represent examples of machine or computer readable media on which instructions/code executable by the controller 101 and/or its processor may be stored. Machine or computer readable media may generally refer to any medium or media used to provide instructions to the controller 101 and/or its processor, including volatile media, such as dynamic memory used for the storage media 102 or for buffers within the controller 101, and non-volatile media, such as electronic media, optical media, and magnetic media.

In some aspects, the controller 101 may be configured to store data received from the host device 104 in the flash memory 103 in response to a write command from the host device 104. The controller 101 is further configured to read data stored in the flash memory 103 and to transfer the read data to the host device 104 in response to a read command from the host device 104. A host device 104 may be sometimes referred to as a host or a host system.

The host device 104 represents any device configured to be coupled to the data storage system 100 and to store data in the data storage system 100. The host device 104 may be a computing system such as a personal computer, a server, a workstation, a laptop computer, a personal digital assistant (PDA), a smart phone, or the like. Alternatively, the host device 104 may be an electronic device such as a digital camera, a digital audio player, a digital video recorder, or the like.

In some aspects, the storage medium 102 represents volatile memory used to temporarily store data and information used to manage the data storage system 100. According to aspects of the subject technology, the storage medium 102 is random access memory (RAM), such as double data rate (DDR) RAM. Other types of RAM may be also used to implement the storage medium 102. The storage medium 102 may be implemented using a single RAM module or multiple RAM modules. While the storage medium 102 is depicted as being distinct from the controller 101, those skilled in the art will recognize that the storage medium 102 may be incorporated into the controller 101 without departing from the scope of the subject technology. Alternatively, the storage medium 102 may be a non-volatile memory, such as a magnetic disk, flash memory, peripheral SSD, and the like.

As further depicted in FIG. 1, the data storage system 100 may also include the host interface 105. The host interface 105 may be configured to be operably coupled (e.g., by wired or wireless connection) to the host device 104, to receive data from the host device 104 and to send data to the host device 104. The host interface 105 may include electrical and physical connections, or a wireless connection, for operably coupling the host device 104 to the controller 101 (e.g., via the I/O interface of the controller 101). The host interface 105 may be configured to communicate data, addresses, and control signals between the host device 104 and the controller 101. Alternatively, the I/O interface of the controller 101 may include and/or be combined with the host interface 105. The host interface 105 may be configured to implement a standard interface, such as a small computer system interface (SCSI), a serial-attached SCSI (SAS), a fiber channel interface, a peripheral component interconnect express (PCIe), a serial advanced technology attachment (SATA), a universal serial bus (USB), or the like. The host interface 105 may be configured to implement only one interface. Alternatively, the host interface 105 (and/or the I/O interface of controller 101) may be configured to implement multiple interfaces, which may be individually selectable using a configuration parameter selected by a user or programmed at the time of assembly. The host interface 105 may include one or more buffers for buffering transmissions between the host device 104 and the controller 101.

The flash memory 103 may represent a non-volatile memory device for storing data. According to aspects of the subject technology, the flash memory 103 includes, for example, a NAND flash memory. The flash memory 503 may include a single flash memory device or chip, or (as depicted in FIG. 1) may include multiple flash memory devices or chips arranged in multiple channels. The flash memory 103 is not limited to any particular capacity or configuration. For example, the number of physical blocks, the number of physical pages per physical block, the number of sectors per physical page, and the size of the sectors may vary within the scope of the subject technology.

The flash memory may have a standard interface specification so that chips from multiple manufacturers can be used interchangeably (at least to a large degree). The interface hides the inner working of the flash and returns only internally detected bit values for data. In aspects, the interface of the flash memory 103 is used to access one or more internal registers 106 and an internal flash controller 107 for communication by external devices (e.g., the controller 101). In some aspects, the registers 106 may include address, command, and/or data registers, which internally retrieve and output the necessary data to and from a NAND memory cell array 108. A NAND memory cell array 108 may be sometimes referred to as a NAND array, a memory array, or a NAND. For example, a data register may include data to be stored in the memory array 108, or data after a fetch from the memory array 108 and may also be used for temporary data storage and/or act like a buffer. An address register may store the memory address from which data will be fetched to the host device 104 or the address to which data will be sent and stored. In some aspects, a command register is included to control parity, interrupt control, and the like. In some aspects, the internal flash controller 107 is accessible via a control register to control the general behaviour of the flash memory 103. The internal flash controller 107 and/or the control register may control the number of stop bits, word length, receiver clock source, and may also control switching the addressing mode, paging control, coprocessor control, and the like.

In some aspects, the registers 106 may also include a test register. The test register may be accessed by specific addresses and/or data combinations provided at the interface of flash memory 103 (e.g., by specialized software provided by the manufacturer to perform various tests on the internal components of the flash memory). In further aspects, the test register may be used to access and/or modify other internal registers, for example the command and/or control registers. In some aspects, test modes accessible via the test register may be used to input or modify certain programming conditions of the flash memory 103 (e.g., read levels) to dynamically vary how data is read from the memory cells of the memory arrays 108. The registers 106 may also include one or more data latches coupled to the flash memory 103.

It should be understood that in all cases data may not always be the result of a command received from the host 104 and/or returned to the host 104. In some aspects, the controller 101 may be configured to execute a read operation independent of the host 104 (e.g., to verify read levels or BER). The predicate words "configured to," "operable to," and "programmed to" as used herein do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

The controller 101 may perform the operations identified in blocks 302-308. The controller 101 may cause the operations identified in blocks 302-308 to occur, or the controller 101 may provide instructions to cause or facilitate the controller 107 (and the registers 106) to perform operations identified in blocks 302-308.

Figure 2A:
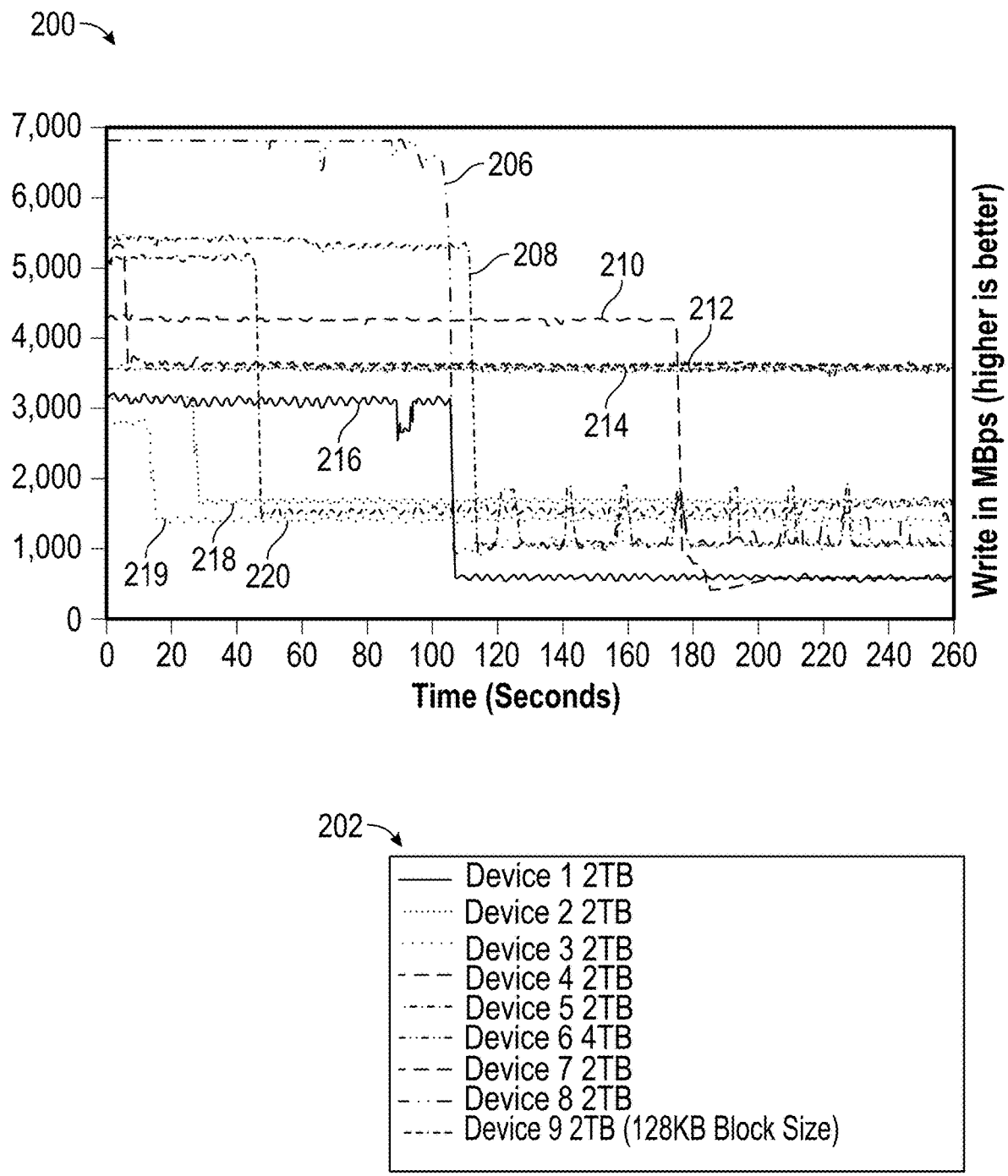
FIG. 2A illustrates an example of a graph for a sequential write bandwidth over time for various memory devices.

FIG. 2A illustrates an example of a graph for a sequential write bandwidth over time for various memory devices. As described above in the Background section, conventional SSDs may exhibit inconsistent performance that result in poor user experience. As shown in index 202, each line (lines 206, 208, 210, 212, 214, 216, 218, 219 and 220) in the graph 200 may correspond to a sustained sequential write for a different storage device (e.g., a corresponding one of Device 1, Device 2, . . . , Device 9, shown in index 202). The graph plots megabytes per second (MBps) over time for the different devices. With large writes (sometimes called sustained sequential writes), traditional hybrid design SSDs first route write traffic to blocks configured as SLC, and performance drops as time progresses when these blocks need to be programmed in QLC mode. In many cases, average performance (for the duration of time shown in the graph) is likely to be lower than if the large write is written to a quad-level cell (QLC). If there is a short burst followed by idle time, a device may write to SLC and in the background write to other types of memory. For large writes, knowledge of the upcoming data and expected performance may be used by the SSD to prevent lower average performance and to provide consistent performance to the user.

In some conventional systems, a host application (e.g., Windows 10 copy application) collects information regarding the upcoming write volume and notifies the device of the information. The information about the upcoming write volume is provided from the host to the device over the storage interface; mechanics of that communication is protocol specific. There are several host application programming interfaces (APIs) that provide a mechanism for an application to pre-allocate a file before it is written. Unfortunately, these APIs ultimately result in zero's being written first to the requested size, and then the application subsequently fills the file with the real file data. This behaviour is not optimal for SSDs, as it would result in 2 times write amplification. In addition, there is no indication to the SSD prior to the start of a large write, of the intention of the application to write a large file. Techniques described herein may help address at least some of these problems with proper resource planning enabled by host-device cooperation.

The non-volatile memory express (NVMe) specification provides a data set management command which defines attributes that allow a host application to indicate a starting logical block address (LBA), an LBA range, and a hint to "prepare" to write. This information may be used to provide an SSD time to prepare for a large write, and if needed, perform some internal operations to optimize for the coming write. Some additional attributes which can also be attached to a given range include: an indication whether the data will be written sequentially, and the anticipated frequency at which the data would be accessed in the future. These hints may be used by the SSD to better manage the device's storage memory.

A host application may be modified in order to inform the storage device regarding intended writes to the SSD. As an example, if an application plans to copy a large file from an external storage device to the internal storage, the application may perform the following tasks: determine the size of the file to be transferred; ensure that there is enough storage space on the target for the large file; open a new file for writing and write the first 4K of the file; retrieve the LBA of the start of the file from the file system; issue a Dataset Management command with the obtained start LBA and desired length, along with attributes indicating a pre-write prepare; and when the Dataset Management command completes, the application can begin writing the file to the storage device. In some aspects, a helper application library which implements some of the details described above, may be used. This application library provides a simple API and abstract some of the details associated with issuing the DataSet Management commands to the SSD device.

In some aspects, a storage filter driver may be used to send hints to the device without a change to a given application. When a file is opened, there are certain attributes used in the system call which indicate if the file is being opened for reading, writing, or appending. The filter driver may be used to send information to the device in order to enable better memory management on the SSD. When a file is opened, the LBA ranges which comprise the file may be sent to the SSD. The SSD may then cache and/or its read look ahead algorithms in order to better predict what the host application is likely to access next. If a file existed previously, and again is opened for write, this often results in the original file data to be overwritten. Using the file extension, the filter driver may then determine that the write is sequential. For example, if the file is a bin, exe, iso, MP3, wav file, then the file is likely written sequentially. The filter driver may be used in conjunction with a user level application or may be used independently to provide as much information regarding the file access to the drive prior to the actual I/O accesses from the host application.

In some aspects, after receiving the information from the host, the device may make certain evaluations and calculation to plan for the incoming write volume. When the data is written to the SSD, it is routed in a consistent fashion. Finally, the host may optionally indicate the end of write operation to the device.

Figure 2B:
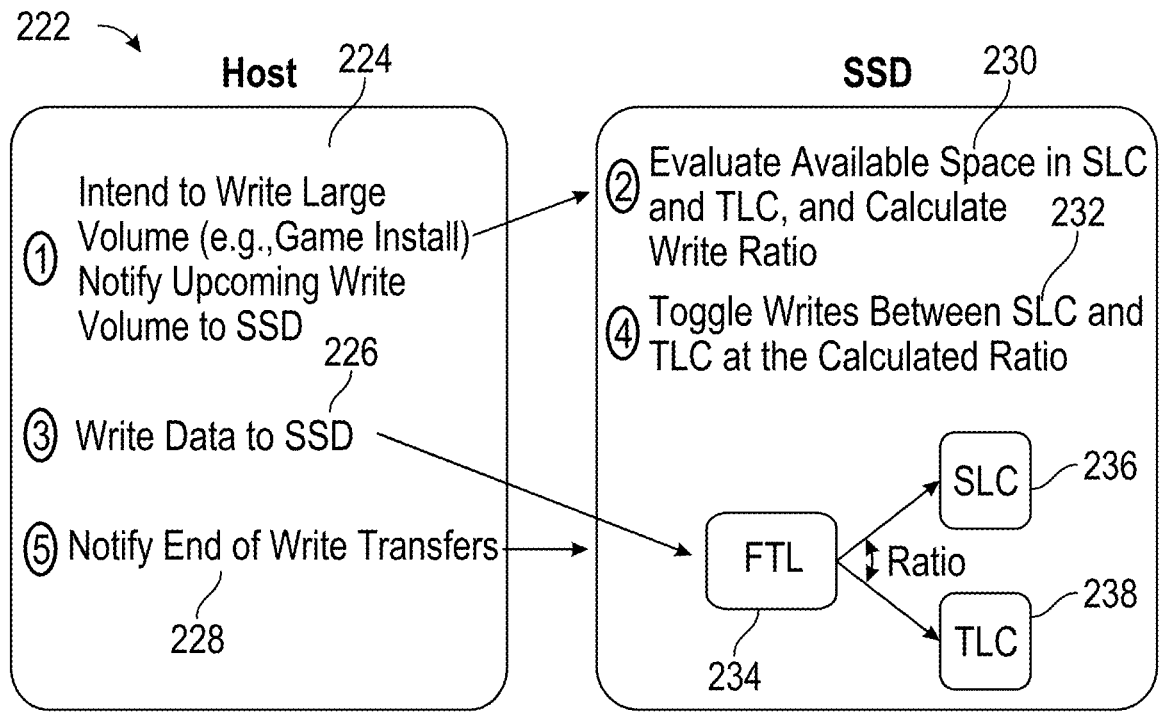
FIG. 2B illustrates a schematic diagram of an example system comprising a host and a storage device for large write planning, according to one or more embodiments.

FIG. 2B shows a schematic diagram of an example system 222 comprising a host and a storage device for large write planning, according to some embodiments. A host (e.g., the host 104) may transmit an intent (or an indication) to write (224) a large volume (e.g., a game install), and/or notify an SSD (e.g., the data storage system 100) regarding an upcoming write volume. The SSD may evaluate (230) available space in different memory types (e.g., SLC and TLC) and calculate a write ratio for writing to the different memory types. The host may subsequently write (226) data for the large volume to the SSD. The SSD (e.g., a flash translation layer, FTL 234) toggles writes between the memory types (e.g., SLC 236, TLC 238) based on the computed ratio (computed earlier in step 232). In some aspects, the host may notify (228) the SSD about end of write transfers, to indicate to the SSD that the write transfer for the large volume is complete. The SSD may use the notification to switch to a different write schedule.

The following description focuses on the planning and routing aspects, according to some embodiments. In some aspects, when a device is notified of the size of the incoming write data burst, the device evaluates the internal state and will determine the routing plan to serve the write. If the total size of incoming write burst is smaller than available space in SLC (e.g., the incoming burst can be entirely written to SLC configured blocks, without triggering block conversion from SLC to TLC), then the device may route the entire write into the SLC configured blocks. In other cases, when the SLC has insufficient capacity to accept the incoming burst, the following calculation may be used to determine the split between SLC and TLC writings. Suppose W indicates the total upcoming burst write, S indicates ideal volume written to SLC, T indicates an ideal volume written to TLC, F indicates total free logical device space, B indicates available burst space, and D indicates cell density (3 for tri-level cell or TLC, and 4 for quad-level cell or QLC). The following invariants hold: $S+T=W$, D times $S+T=F$. Therefore, $S=(F-W)/(D-1)$, and $T=W-[(F-W)/(D-1)]$. The volume written to SLC type memory is smaller of S and B, and the rest is routed to TLC. Once the ratio between S and T routing has been determined, the SSD controller data path, managed by an FTL, may alternate data routing between SLC and TLC open blocks. Although the example calculations and formulae described above focus on two types of memory (SLC and TLC, or SLC and QLC), some systems may have all types of memories (e.g., SLC, TLC and QLC), and the ratios may be determined by considering available spaces in all the memory types. In one or more aspects, a large write may be an example of a write data burst, and a write for a large volume may be an example of a write data burst. The terms "write data burst," "large writes" and "write for a large volume" may be used interchangeably.

Figure 2C:
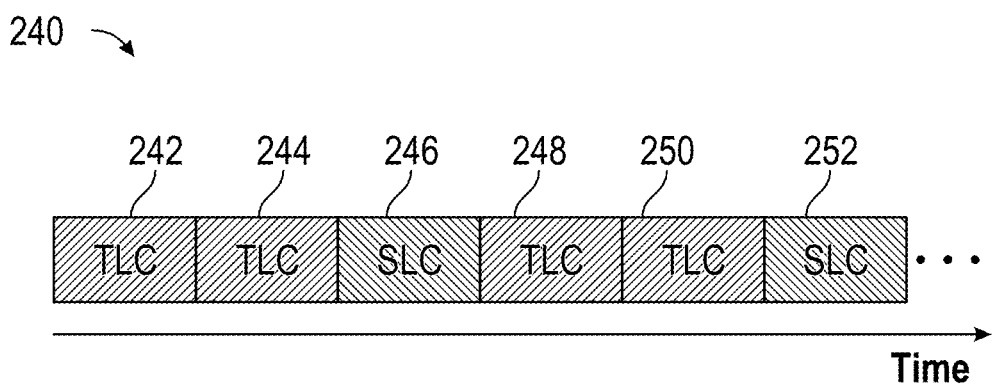
FIG. 2C shows an example schedule for large write planning, according to one or more embodiments.

In some aspects, switching between SLC and QLC may be performed on a fine granularity, e.g., on a NAND block page or plane boundary. However, for various performance reasons it may be beneficial to continue writing to one block type until the block is completely full and only then switch to writing a different block type. FIG. 2C shows an example schedule 240 for large write planning, according to some embodiments. In some aspects, the SSD may write chunks of data corresponding to the large write to a first type of memory (e.g., TLC blocks 242, 244), switch to write to a second type of memory (e.g., SLC block 246), return to write to the first type of memory (e.g., TLC blocks 248, 250), subsequently write to the second type of memory (e.g., SLC block 252), and so on, until the data corresponding to the large write is written to the device memory. Although the example in FIG. 2C shows a write starting with TLC blocks then writing to SLC blocks, the order of memory types for the write may be determined based on write speeds for the different memory types and preferences of a user. A SLC memory may, for example, provide faster writes which may help provide a faster response to the user at least initially, in some instances. Additionally, even though FIG. 2C shows only two types of memory (TLC and SLC), there may be more than two types of memory (e.g., SLC, TLC and QLC) in some embodiments.

An advantage for the aforementioned techniques is consistent performance that leads to improved user experience. Moreover, there is a benefit of improved power and thermal efficiency. As described above, proper planning and calculation of the amount of data written to SLC prevents the need to free QLC space by reading data out of SLC configured blocks, writing them to a QLC configured block, erasing the SLC configured block and configuring it as a QLC block (sometimes referred to as the process of conversion). The operation of relocating data from SLC to QLC is redundant, reduces performance and costs power and extra heat dissipation. Proper planning of SLC and QLC portions may also lead to longer battery life and/or cooler device. Finally, consistent thermal behaviour may be achieved by interleaving the SLC and QLC writes, as opposed to high dissipation at one part of a write (e.g., the QLC) and lower at a second part. Bursting data into SLC configured blocks consumes different power compared with bursting it into QLC configured blocks. In some cases, the power consumed for bursting to SLC configured blocks is higher because of the overall higher system rates. High power dissipation concentration is undesired, as it can lead to thermal throttling events. Interleaved approach smoothens the dissipation over a longer period of time which is beneficial.

Figure 3:
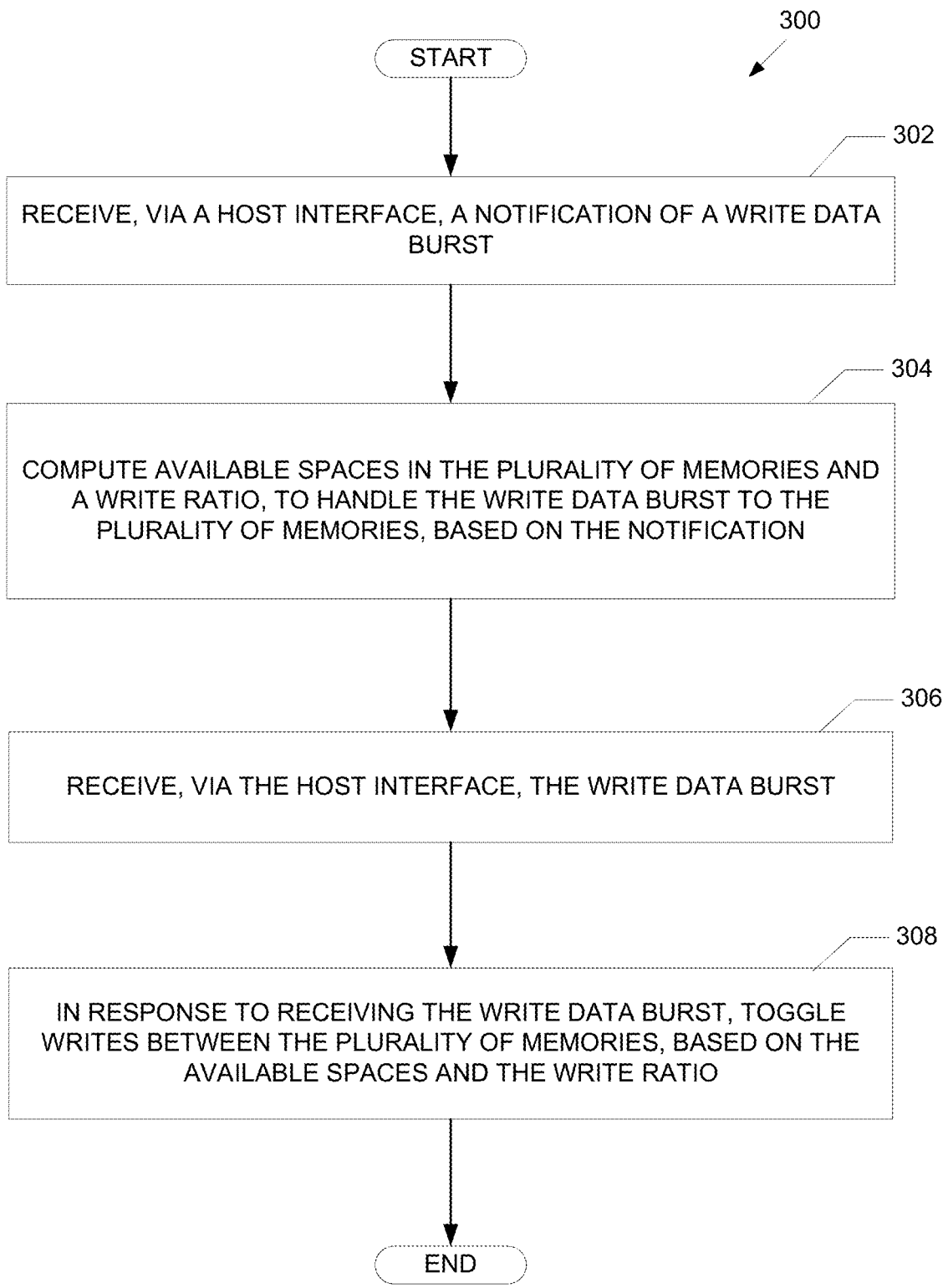
FIG. 3 shows a flowchart of an example process for large write planning for storage devices, according to one or more embodiments.

It may be instructive to describe the structures shown in FIGS. 2A-2C with respect to FIG. 3, which is a flowchart illustrating an example process 300 for large write planning in a storage device, according to some embodiments. One or more blocks of FIG. 3 may be executed by a computing system (including, e.g., a controller 107 of a flash memory, a data storage controller 101 of a data storage system 100 or a solid-state storage device (SSD), a processor, or the like). The data storage system 100 may include a device memory (e.g., the flash memory 103) that may include a plurality of memories. Each memory of the plurality of memories may be configured to be a memory type based on different capacity, different performance characteristics, or a combination thereof. For example, the NAND array 108 may include a memory of type SLC, a memory of type TLC, and/or a memory of type QLC. In some aspects, the plurality of memories is configured to be memory types that include (i) a single level cell (SLC) and (ii) at least one of a tri-level cell (TLC), a quad-level cell (QLC), and a penta-level cell (PLC). The data storage system 100 may also include a host interface (e.g., the host interface 105) for coupling the data storage device to a host system (e.g., the host 104). The host interface may be configured to receive a notification of a write data burst from the host system. Examples of a computing system or a controller may be the controller 101. Similarly, a non-transitory machine-readable medium may include machine-executable instructions thereon that, when executed by a computer or machine, perform the processes of FIG. 3. The steps of example process 300 may be implemented as hardware, firmware, software, or a combination thereof.

In step 302, the controller 101 may receive, via the host interface, the notification of the write data burst. In some aspects, the notification of the write data burst may include a dataset management command that includes a starting logical block address (LBA), an LBA range, and an indication to cause the data storage device to prepare for the write data burst (e.g., perform internal operations to prepare for and/or optimize for the write data burst).

In step 304, the controller 101 may compute available spaces in the plurality of memories and a write ratio, to handle the write data burst to the plurality of memories, based on the notification. In some aspects, the controller 101 may be further configured to compute a split between the writes to the plurality of memories based on a total write size of the write data burst and based on the available space and cell density of at least one of the plurality of memories. The notification of the write data burst may include the total write size of the write data burst.

In step 306, the controller 101 may receive, via the host interface, the write data burst. In step 308, the controller 101 may, in response to receiving the write data burst, toggle writes between the plurality of memories, based on the available spaces and the write ratio. In some aspects, the controller 101 may be further configured to toggle the writes between the plurality of memories in accordance with a determination that the available spaces include a space in a first memory of the plurality of memories that is less than or equal to a total write size of the write data burst. In some aspects, the controller 101 may be further configured to toggle the writes between the plurality of memories at a page boundary and/or multiple pages boundary. In some aspects, the controller 101 may be further configured to toggle write units between the plurality of memories at a predetermined ratio. The write units may be single pages or multiple pages. Multiple pages may include several pages, an entire NAND block, or even several blocks. Typically, in an SSD, there are multiple dies. Suppose there are N dies. Assume a ratio of X:Y between SLC and TLC. The routing algorithm may write X SLC pages to each die (total of X times N pages) followed by Y times N pages of TLC, write 10 times X SLC pages to each die (total of 10 times X times N pages) followed by 10 times Y times N pages of TLC, write X SLC blocks to each die (total of X times N blocks) followed by Y times N blocks of TLC, write 10 times X SLC blocks to each die (total of 10 times X times N blocks) followed by 10 times Y times N blocks of TLC. In some aspects, the controller 101 may be further configured to continue writing to a block of a first block type until the block is completely full before switching to another block of a different block type. In some aspects, the controller 101 may be further configured to toggle the writes between the plurality of memories by interleaving the writes including writing to a first memory of the plurality of memories followed by writing to a second memory of the plurality of memories followed by writing to the first memory, based on the performance characteristics of the first memory and the second memory. This is different from first exhausting SLC then writing to TLC, for operating a hybrid design. In some aspects, the controller 101 may perform any calculation before the writes, instead of or in addition to detecting exhaustion of SLC before writing to TLC. In some aspects, the controller 101 may be further configured to: predict an access pattern for locations in the device memory a host application is to access next, based on the dataset management command; and determine an order of memory types for the toggle between the plurality of memories based on the access pattern. This is different from identifying a file to be written and determining a desired NAND cell SLC or TLC for writing the file.

In some aspects, the notification of the write data burst may include information on (i) whether data corresponding to the write data burst is to be written sequentially and (ii) anticipated frequency at which the data is to be accessed. In some aspects, the controller 101 may be further configured to: predict an access pattern for locations in the device memory a host application is to access next, based on the information; and determine an order of memory types for toggling between the plurality of memories based on the access pattern In some aspects, the controller 101 may be further configured to, in accordance with a determination that the available spaces include a space in a first memory of the plurality of memories that is larger than a total write size of the write data burst, route the write to the first memory of the plurality of memories. The first memory is for having better performance than other memories of the plurality of memories.

Various example embodiments and aspects of the disclosure are described below for convenience. These are provided as examples, and do not limit the subject technology. Some of the examples described below are illustrated with respect to the figures disclosed herein simply for illustration purposes without limiting the scope of the subject technology.

One or more aspects of the subject technology provide a data storage device (e.g., the data storage system 100) that may include a device memory, a host interface for coupling the data storage device to a host system, and a controller. The device memory may include a plurality of memories; each memory of the plurality of memories may be configured to be a memory type based on different capacity, different performance characteristics, or a combination thereof (e.g., a combination of the different capacity and the different performance characteristics). The host interface may be configured to receive a notification of a write data burst from the host system. The controller may be configured to:

receive, via the host interface, the notification of the write data burst; compute available spaces in the plurality of memories and a write ratio, to handle the write data burst to the plurality of memories, based on the notification; receive, via the host interface, the write data burst; and in response to receiving the write data burst, toggle writes between the plurality of memories, based on the available spaces and the write ratio.

The controller may be further configured to compute a split between the writes to the plurality of memories based on a total write size of the write data burst and based on the available space and cell density of at least one of the plurality of memories. The notification of the write data burst may include the total write size of the write data burst.

The controller may be further configured to toggle the writes between the plurality of memories in accordance with a determination that the available spaces include a space in a first memory of the plurality of memories that is less than or equal to a total write size of the write data burst.

The controller may be further configured to toggle the writes between the plurality of memories at a page boundary and multiple pages boundary.

The controller may be further configured to continue writing to a block of a first block type until the block is completely full before switching to another block of a different block type.

The controller may be further configured to, in accordance with a determination that the available spaces include a space in a first memory of the plurality of memories that is larger than a total write size of the write data burst, route the write to the first memory of the plurality of memories. The first memory is for having better performance than other memories of the plurality of memories.

In some aspects, the plurality of memories may be configured to be memory types that include (i) a single level cell (SLC) and (ii) at least one of a tri-level cell (TLC), a quad-level cell (QLC), and a penta-level cell (PLC).

In some aspects, the controller may be further configured to toggle the writes between the plurality of memories by interleaving the writes including writing to a first memory of the plurality of memories followed by writing to a second memory of the plurality of memories followed by writing to the first memory, based on the performance characteristics of the first memory and the second memory.

In some aspects, the notification of the write data burst comprises a dataset management command that includes a starting logical block address (LBA), an LBA range, and an indication to cause the data storage device to prepare for the write data burst. The controller may be further configured to: predict an access pattern for locations in the device memory a host application is to access next, based on the dataset management command; and determine an order of memory types for the toggle between the plurality of memories based on the access pattern.

In some aspects, the notification of the write data burst includes information on (i) whether data corresponding to the write data burst is to be written sequentially and (ii) anticipated frequency at which the data is to be accessed. The controller may be further configured to: predict an access pattern for locations in the device memory a host application is to access next, based on the information; and determine an order of memory types for toggling between the plurality of memories based on the access pattern.

In other aspects, a method is provided for large write planning for performance consistency and resource usage efficiency. The method is implemented using one or more controllers for one or more storage devices. The method may include receiving, via a host interface, a notification of a write data burst. The method may also include computing available spaces in a plurality of memories and a write ratio, to handle the write data burst to the plurality of memories, based on the notification. The method may also include receiving, via the host interface, the write data burst, and in response to receiving the write data burst, toggling writes between the plurality of memories, based on the available spaces and the write ratio.

In further aspects, a system may include: means for receiving, via a host interface, a notification of a write data burst; means for computing available spaces in a plurality of memories and a write ratio, to handle the write data burst to the plurality of memories, based on the notification; means for receiving, via the host interface, the write data burst; and means for, in response to receiving the write data burst, toggling writes between the plurality of memories, based on the available spaces and the write ratio.

Various implementations of the methods and systems provide large write planning for performance consistency and resource usage efficiency. The techniques described herein may be used to improve solid state drive (SSD) performance and provide consistent performance and user experience. The term planning may refer to, for example, handling, managing, preparation and/or scheduling.

In one or more aspects, a method includes one or more methods, operations or portions thereof described herein. In one or more aspects, an apparatus includes one or more memories and one or more processors, the one or more processors configured to cause performing one or more methods, operations or portions thereof described herein. In one or more aspects, an apparatus includes means adapted for performing one or more methods, operations or portions thereof described herein. In one or more aspects, a hardware apparatus includes circuits configured to perform one or more methods, operations or portions thereof described herein. In one or more aspects, an apparatus includes components operable to carry out one or more methods, operations or portions thereof described herein. In one or more aspects, a non-transitory machine-readable storage medium (e.g., one or more memories and/or one or more registers) store instructions that, when executed by one or more processors, cause one or more processors to perform one or more methods, operations or portions thereof described herein.

In some examples, to illustrate the interchangeability of hardware and software, items such as the various illustrative blocks, modules, components, methods, operations, instructions, and algorithms may have been described generally in terms of their functionality. In some examples, whether such functionality is implemented as hardware, software or a combination of hardware and software depends upon the particular application and design constraints imposed on the overall system. Skilled artisans may implement the described functionality in varying ways for each particular application.

Headings and subheadings, if any, are used for convenience only and do not limit the invention. The word "exemplary" is used to mean serving as an example or illustration. Any implementation described herein as an "example" is not necessarily to be construed as preferred or advantageous over other implementations. Relational terms such as first and second and the like may be used simply for ease of understanding without necessarily requiring or implying any actual relationship or order between elements or actions and without necessarily requiring or implying that they have different characteristics unless stated otherwise.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" and "at least one of A, B, or C" may refer to only A, only B, or only C; any combination of A, B, and C; and/or at least one of each of A, B, and C.

The expression of a first element, a second elements "and/or" a third element should be understood as one of the first, second and third elements or as any or all combinations of the first, second and third elements. By way of example, A, B and/or C can refer to only A; only B; only C; any or some combination of A, B, and C; or all of A, B, and C. Furthermore, an expression "element A/element B" may be understood as element A and/or element B.

In one or more aspects, the terms "between" and "among" may be used interchangeably simply for convenience unless stated otherwise. For example, an expression "between a plurality of elements" may be understood as among a plurality of elements. In another example, an expression "among a plurality of elements" may be understood as between a plurality of elements. In one or more examples, the number of elements may be two. In one or more examples, the number of elements may be more than two.

In one or more aspects, the terms "each other" and "one another" may be used interchangeably simply for convenience unless stated otherwise. For example, an expression "different from each other" may be understood as being different from one another. In another example, an expression "different from one another" may be understood as being different from each other. In one or more examples, the number of elements involved in the foregoing expression may be two. In one or more examples, the number of elements involved in the foregoing expression may be more than two.

Features of various embodiments of the present disclosure may be partially or wholly coupled to or combined with each other and may be variously inter-operated, linked or driven together. The embodiments of the present disclosure may be carried out independently from each other or may be carried out together in a co-dependent or related relationship. In one or more aspects, the components of each apparatus according to various embodiments of the present disclosure are operatively coupled and configured.

Unless otherwise defined, the terms (including technical and scientific terms) used herein have the same meaning as commonly understood by one of ordinary skill in the art to which example embodiments belong. It is further understood that terms, such as those defined in commonly used dictionaries, should be interpreted as having a meaning that is, for example, consistent with their meaning in the context of the relevant art and should not be interpreted in an idealized or overly formal sense unless expressly defined otherwise herein.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order, with the exception of steps and/or operations necessarily occurring in a particular order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In describing a temporal relationship, when the temporal order is described as, for example, "after," "subsequent," "next," "before," "preceding," "prior to," or the like, a case that is not consecutive or not sequential may be included unless a more limiting term, such as "just," "immediate(ly)," or "direct(ly)," is used.

It is understood that, although the term "first," "second," or the like may be used herein to describe various elements, these elements should not be limited by these terms. These terms are only used to distinguish one element from another. For example, a first element could be a second element, and, similarly, a second element could be a first element, without departing from the scope of the present disclosure. Furthermore, the first element, the second element, and the like may be arbitrarily named according to the convenience of those skilled in the art without departing from the scope of the present disclosure.

In describing elements of the present disclosure, the terms "first," "second," "A," "B," "(a)," "(b)," or the like may be used. These terms are intended to identify the corresponding element(s) from the other element(s), and these are not used to define the essence, basis, order, or number of the elements.

In one or more examples, when an element is "connected" or "coupled" to another element, the element can be directly connected or coupled to another element, and can be indirectly connected or coupled to another element with one or more intervening elements disposed or interposed between the elements, unless otherwise specified.

The disclosure is provided to enable any person skilled in the art to practice the various aspects described herein. In some instances, when a detailed description of well-known functions or configurations may unnecessarily obscure aspects of the present disclosure, the detailed description thereof may be omitted. The disclosure provides various examples of the subject technology, and the subject technology is not limited to these examples. Various modifications to these aspects will be readily apparent to those skilled in the art, and the principles described herein may be applied to other aspects.

Unless stated otherwise, like reference numerals may refer to like elements throughout even when they are shown in different drawings. In one or more aspects, identical elements (or elements with identical names) in different drawings may have the same or substantially the same functions and properties unless stated otherwise. Names of the respective elements used in the following explanations are selected only for convenience and may be thus different from those used in actual products.

The shapes, sizes, areas, ratios, numbers, and the like disclosed in the drawings for describing implementations of the present disclosure are merely examples, and thus, the present disclosure is not limited to the illustrated details.

When the term "comprise," "have," "include," "contain," "constitute," or the like is used, one or more other elements may be added unless a term such as "only" or the like is used. The terms used in the present disclosure are merely used in order to describe particular embodiments, and are not intended to limit the scope of the present disclosure. The terms used herein are merely used in order to describe example embodiments, and are not intended to limit the scope of the present disclosure. The terms of a singular form may include plural forms unless the context clearly indicates otherwise. An element proceeded by "a," "an," "the," or "said" does not, without further constraints, preclude the existence of additional elements.

In one or more aspects, an element, feature, or corresponding information (e.g., a level, range, dimension, size, or the like) is construed as including an error or tolerance range even where no explicit description of such an error or tolerance range is provided. An error or tolerance range may be caused by various factors (e.g., process factors, internal or external impact, or the like). Furthermore, while the subject disclosure may provide many example ranges and values, these are non-limiting examples, and other ranges and values are within the scope of the subject technology.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A data storage device, comprising:
 a device memory comprising a plurality of memories, wherein each memory of the plurality of memories is configured to be a memory type based on different capacity, different performance characteristics, or a combination thereof;
 a host interface for coupling the data storage device to a host system, wherein the host interface is configured to receive a notification of a write data burst from the host system; and
 a controller configured to:
  receive, via the host interface, the notification of the write data burst;
  compute available spaces in the plurality of memories and a write ratio, to handle the write data burst to the plurality of memories, based on the notification;
  receive, via the host interface, the write data burst; and
  in response to receiving the write data burst, toggle writes between the plurality of memories, based on the available spaces and the write ratio,
 wherein the notification of the write data burst comprises a dataset management command that includes a starting logical block address (LBA), an LBA range, and an indication to cause the data storage device to prepare for the write data burst, and
 wherein the controller is further configured to:
  predict an access pattern for locations in the device memory a host application is to access next, based on the dataset management command; and
  determine an order of memory types for toggling the writes between the plurality of memories based on the access pattern.

2. The data storage device of claim 1, wherein the controller is further configured to:
 compute a split between the writes to the plurality of memories based on a total write size of the write data burst and based on the available spaces and cell density of at least one of the plurality of memories,
 wherein the notification of the write data burst includes the total write size of the write data burst.

3. The data storage device of claim 1, wherein the controller is further configured to:
 toggle the writes between the plurality of memories in accordance with a determination that the available spaces include a space in a first memory of the plurality of memories that is less than or equal to a total write size of the write data burst.

4. The data storage device of claim 1, wherein the controller is further configured to:
 toggle the writes between the plurality of memories at a page boundary and multiple pages boundary.

5. The data storage device of claim 1, wherein the controller is further configured to:
 continue to write to a block of a first block type until the block is completely full before switching to another block of a different block type.

6. The data storage device of claim 1, wherein the controller is further configured to:
 in accordance with a determination that the available spaces include a space in a first memory of the plurality of memories that is larger than a total write size of the write data burst, route the write data burst to the first memory of the plurality of memories,
wherein the first memory is for having better performance than other memories of the plurality of memories.

7. The data storage device of claim 1, wherein the plurality of memories are configured to be memory types that include (i) a single level cell (SLC) and (ii) at least one of a tri-level cell (TLC), a quad-level cell (QLC) and a penta-level cell (PLC).

8. The data storage device of claim 1, wherein the controller is configured to:
toggle the writes between the plurality of memories by interleaving the writes including writing to a first memory of the plurality of memories followed by writing to a second memory of the plurality of memories followed by writing to the first memory, based on the performance characteristics of the first memory and the second memory.

9. The data storage device of claim 1, wherein the notification of the write data burst comprises information on (i) whether data corresponding to the write data burst is to be written sequentially and (ii) anticipated frequency at which the data is to be accessed, and
wherein the access pattern is based further on the information.

10. A method implemented using one or more controllers for one or more storage devices, the method comprising:
receiving, via a host interface, a notification of a write data burst;
computing available spaces in a plurality of memories and a write ratio, to handle the write data burst to the plurality of memories, based on the notification;
receiving, via the host interface, the write data burst; and
in response to receiving the write data burst, toggling writes between the plurality of memories, based on the available spaces and the write ratio,
wherein the notification of the write data burst comprises a dataset management command that includes a starting logical block address (LBA), an LBA range, and an indication to prepare for the write data burst, and
wherein the method comprises:
predicting an access pattern for locations in a device memory a host application is to access next, based on the dataset management command; and
determining an order of memory types for toggling the writes between the plurality of memories based on the access pattern.

11. The method of claim 10, further comprising:
computing a split between the writes to the plurality of memories based on a total write size of the write data burst and based on the available spaces and cell density of at least one of the plurality of memories,
wherein the notification of the write data burst includes the total write size of the write data burst.

12. The method of claim 10, further comprising:
toggling the writes between the plurality of memories in accordance with a determination that the available spaces include a space in a first memory of the plurality of memories that is less than or equal to a total write size of the write data burst.

13. The method of claim 10, further comprising:
toggling the writes between the plurality of memories at a page boundary and multiple pages boundary.

14. The method of claim 10, further comprising:
continue writing to a block of a first block type until the block is completely full before switching to another block of a different block type.

15. The method of claim 10, further comprising:
in accordance with a determination that the available spaces include a space in a first memory of the plurality of memories that is larger than a total write size of the write data burst, routing the write data burst to the first memory of the plurality of memories,
wherein the first memory is for having better performance than other memories of the plurality of memories.

16. The method of claim 10, wherein the plurality of memories are configured to be memory types that include (i) a single level cell (SLC) and (ii) at least one of a tri-level cell (TLC) and a quad-level cell (QLC).

17. The method of claim 10, wherein each memory of the plurality of memories is configured to be a memory type based on different capacity, different performance characteristics, or a combination thereof,
the method further comprising:
toggling the writes between the plurality of memories by interleaving the writes including writing to a first memory of the plurality of memories followed by writing to a second memory of the plurality of memories followed by writing to the first memory, based on the performance characteristics of the first memory and the second memory.

18. A system, comprising:
means for receiving, via a host interface, a notification of a write data burst;
means for computing available spaces in a plurality of memories and a write ratio, to handle the write data burst to the plurality of memories, based on the notification;
means for receiving, via the host interface, the write data burst; and
means for, in response to receiving the write data burst, toggling writes between the plurality of memories, based on the available spaces and the write ratio,
wherein the notification of the write data burst comprises a command that includes a starting logical block address (LBA), an LBA range, and an indication to cause preparing for the write data burst, and
wherein the system comprises:
means for predicting an access pattern for locations in a device memory, based on the command; and
means for determining an order of memory types for toggling the writes between the plurality of memories based on the access pattern.

* * * * *